US011359373B2

(12) United States Patent
Biskup

(10) Patent No.: US 11,359,373 B2
(45) Date of Patent: Jun. 14, 2022

(54) WOODEN PANEL FOR CONSTRUCTION OF WOODEN TIMBER BUILDINGS

(71) Applicant: Stanislav Biskup, Cernosice (CZ)

(72) Inventor: Stanislav Biskup, Cernosice (CZ)

( * ) Notice: Subject to any disclaimer, the term of this patent is extended or adjusted under 35 U.S.C. 154(b) by 0 days.

(21) Appl. No.: 16/803,930

(22) Filed: Feb. 27, 2020

(65) Prior Publication Data

US 2020/0277786 A1 Sep. 3, 2020

(30) Foreign Application Priority Data

Feb. 28, 2019 (CZ) .............................. CZ2019-124

(51) Int. Cl.
| | | |
|---|---|---|
| *B32B 21/13* | (2006.01) | |
| *E04C 2/12* | (2006.01) | |
| *B32B 7/08* | (2019.01) | |
| *E04B 1/26* | (2006.01) | |

(52) U.S. Cl.
CPC ................. *E04C 2/12* (2013.01); *B32B 7/08* (2013.01); *B32B 21/13* (2013.01); *E04B 1/26* (2013.01); *B32B 2607/00* (2013.01); *E04B 2103/04* (2013.01)

(58) Field of Classification Search
CPC ..... B32B 21/13; B32B 21/14; B32B 2607/00; B32B 3/14; B32B 3/18; B32B 7/03
See application file for complete search history.

(56) References Cited

U.S. PATENT DOCUMENTS

| | | | | | |
|---|---|---|---|---|---|
| 5,469,796 | A | * | 11/1995 | Koenig ................... | E05G 1/024 109/49.5 |
| 5,950,319 | A | * | 9/1999 | Harris ..................... | E04F 21/04 33/1 B |
| 6,534,143 | B1 | * | 3/2003 | Thoma ..................... | B32B 7/08 428/44 |
| 8,647,749 | B2 | * | 2/2014 | Norling .................... | E04C 2/12 428/537.1 |
| 2012/0135185 | A1 | | 5/2012 | Preiss | |
| 2020/0016873 | A1 | * | 1/2020 | Mueller ................... | B32B 3/20 |
| 2020/0215784 | A1 | * | 7/2020 | Kuhn ..................... | B32B 15/10 |
| 2020/0299962 | A1 | * | 9/2020 | Espinosa ................ | B32B 21/02 |

FOREIGN PATENT DOCUMENTS

| | | |
|---|---|---|
| DE | 19603833 A1 | 8/1997 |
| DE | 29721848 U1 | 4/1998 |
| EP | 1321598 A2 | 6/2003 |
| EP | 2492410 A1 | 8/2012 |
| EP | 1321598 B1 | 3/2013 |

* cited by examiner

*Primary Examiner* — Brian E Glessner
*Assistant Examiner* — Daniel J Kenny
(74) *Attorney, Agent, or Firm* — Cionca IP Law P.C.; Marin Cionca

(57) ABSTRACT

A waste-less cut-less composed wooden panel for a wooden timber buildings construction. Thanks to the use of the steel wood screws positioned in a pattern, the same buckling resistance as in the case of the commercial wooden panels connected by aluminium nails or wood screws has been achieved with a much lower value of the wooden panel thickness, approximately by 30%. Thanks to the manual assembly of individual waste-less cut-less composed wooden panel, up to 82% of wooden material can be saved compared to commercially available prefabricated wooden panels.

14 Claims, 11 Drawing Sheets

| Panel acc. to example | screw material | numbers of screw per crossing | dimensions of panel (mm) | layers | layer thickness | buckling resistance acc. to example 4A |
|---|---|---|---|---|---|---|
| 1B | steel | 2 | | 3 | 27 / 27 / 27 | 99,1 |
| 1C | alluminium | 2 | | 3 | 38,4 / 38,4 / 38,4 | 99,2 |
| 1D | alluminium | 2 | 1000 x 3000 | 3 | 41,3 / 27 / 41,3 | 99,0 |
| 1E | alluminium | 2 | | 3 | 27 / 27 / 27 | 42,0 |
| - | alluminium | 10* *cannot be manufactured with the technological spacing | | 3 | 27 / 27 / 27 | 97,3 |

Fig. 3

| example 6 | air permeability n50 (1/h) |
|---|---|
| recomended value for passive houses | 0,6 |
| lined panel acc. Example 6A | 0,27 |
| non-lined panel acc. Example 6B | 0,31 |

Fig. 4

| Panel acc. to Example | construction of panel | screw material | number of screws for crossing | layers | layer thickness (mm) | width of panel (mm) | length of panel (mm) | thickness of panel (mm) | total panel intermediate volume (m3) | total volume of finished panel (m3) | opening volume (m3) | material consumption (m3) | material consumption | increasing material consumption to maintain static design resistance | waste cut openings |
|---|---|---|---|---|---|---|---|---|---|---|---|---|---|---|---|
| 2A | composed | steel | 2 | 3 | 27 / 27 / 27 | 50000 | 30000 | 81 | 0.9639 | 0.9639 | 0.2511 | 0.9639 | 100% | 0% | 0% |
| 2B | through-cut | aluminium | 2 | 3 | 38.4 / 38.4 / 38.4 | 50000 | 30000 | 115.2 | 1.728 | 1.37098 | 0.35712 | 1.728 | 179% | 79% | 21% |
| 2C | through-cut | aluminium | 2 | 3 | 43.3 / 27 / 43.3 | 50000 | 30000 | 109.6 | 1.644 | 1.30424 | 0.33976 | 1.644 | 171% | 71% | 21% |

Fig. 5 A

| Panel acc. to Example | construction of panel | screw material | number of screws for crossing | layers | layer thickness (mm) | width of panel (mm) | length of panel (mm) | thickness of panel (mm) | total panel intermediate volume (m3) | total volume of finished panel (m3) | opening volume (m3) | material consumption (m3) | material consumption | increasing material consumption to maintain static design resistance | waste cut openings |
|---|---|---|---|---|---|---|---|---|---|---|---|---|---|---|---|
| 3A | composed | steel | 4 | 3 | 27 / 27 / 27 | 200000 | 30000 | 81 | 3.7989 | 3.7989 | 1.0611 | 3.7989 | 100% | 0% | 0% |
| 3B | through-cut | aluminium | 4 | 3 | 38.4 / 38.4 / 38.4 | 200000 | 30000 | 115.2 | 6.912 | 5.40312 | 1.50912 | 6.912 | 182% | 82% | 22% |
| 3C | through-cut | aluminium | 4 | 3 | 43.3 / 27 / 43.3 | 200000 | 30000 | 109.6 | 6.576 | 5.14224 | 1.43376 | 6.576 | 173% | 73% | 22% |

Fig. 5 B

| example | dimensions of panel (m) | screw material | number of screws per crossing | layers | layer thickness (mm) | panel thickness (mm) | planks width (mm) | rotation of layers (°) | buckling resistance acc. to example 4B (kN) |
|---|---|---|---|---|---|---|---|---|---|
| 1 Solid panels to compare static design resistance + to build a model house for air permeability measurement |||||||||||
| A | 5x3 | steel | 2 | 3 | 27-27-27 | 81 | 200 | 90 | 305.973 |
| B | 1x3 | steel | 2 | 3 | 27-27-27 | 81 | 170 | 90 | 72.492 |
| C | 1x3 | aluminium | 2 | 3 | 38.4-38.4-38.4 | 115.2 | 170 | 90 | - |
| D | 2x3 | aluminium | 2 | 3 | 41.3-27-41.3 | 109.6 | 170 | 90 | - |
| E | 1x3 | aluminium | 2 | 3 | 27-27-27 | 81 | 170 | 90 | - |
| F | 5x5 | steel | 2 | 3 | 27-27-27 | 81 | 170 | 90 | 232.779 |
| - | 1x3 | aluminium | 10* | 3 | 27-27-27 | 81 | 170 | 90 | - |
| G | 1x3 | steel | 4 | 3 | 19-19-19 | 57 | 170 | 90 | 45.289 |
| H | 1x3 | steel | 2 | 3 | 19-19-19 | 57 | 120 | 90 | 45.370 |
| I | 1x3 | steel | 2 | 3 | 29.5-29.5-29.5 | 88.5 | 400 | 90 | 45.278 |
| J | 1x3 | steel | 2 | 3 | 19-19-19 | 57 | 80 | 90 | 65.654 |
| 2 Panels with openings to compare wood material consumption - door and window |||||||||||
| A | 5x3 | steel | 2 | 3 | 27-27-27 | 81 | 200 | 90 | 362.461 |
| B | 5x3 | aluminium | 2 | 3 | 38.4-38.4-38.4 | 115.2 | 200 | 90 | - |
| C | 5x3 | aluminium | 2 | 3 | 41.3-27-41.3 | 109.6 | 200 | 90 | - |
| D | 5x3 | steel | 4 | 3 | 35-19-35 | 89 | 170 | 90 | 702.378 |
| E | 5x3 | steel | 2 | 3 | 19-19-19 | 57 | 400 | 45 | 69.625 |
| F | 5x3 | steel | 2 | 7 | 19-32-19-19-27-27-27 | 170 | 80-80-80-170-200-200-200 | 135-90 | aprox. 1,000 |
| G | 5x3 | steel | 4 | 5 | 15-22-25-22-15 | 99 | 200 | 90 | aprox. 400 |
| 3 Panels with openings to compare wood material consumption - doors, windows, gates |||||||||||
| A | 20x3 | steel | 4 | 3 | 27-27-27 | 81 | 300 | 90 | 1,154.376 |
| B | 20x3 | aluminium | 4 | 3 | 38.4-38.4-38.4 | 115.2 | 300 | 90 | - |
| C | 20x3 | aluminium | 4 | 3 | 41.3-27-41.3 | 109.6 | 300 | 90 | - |

Fig. 6

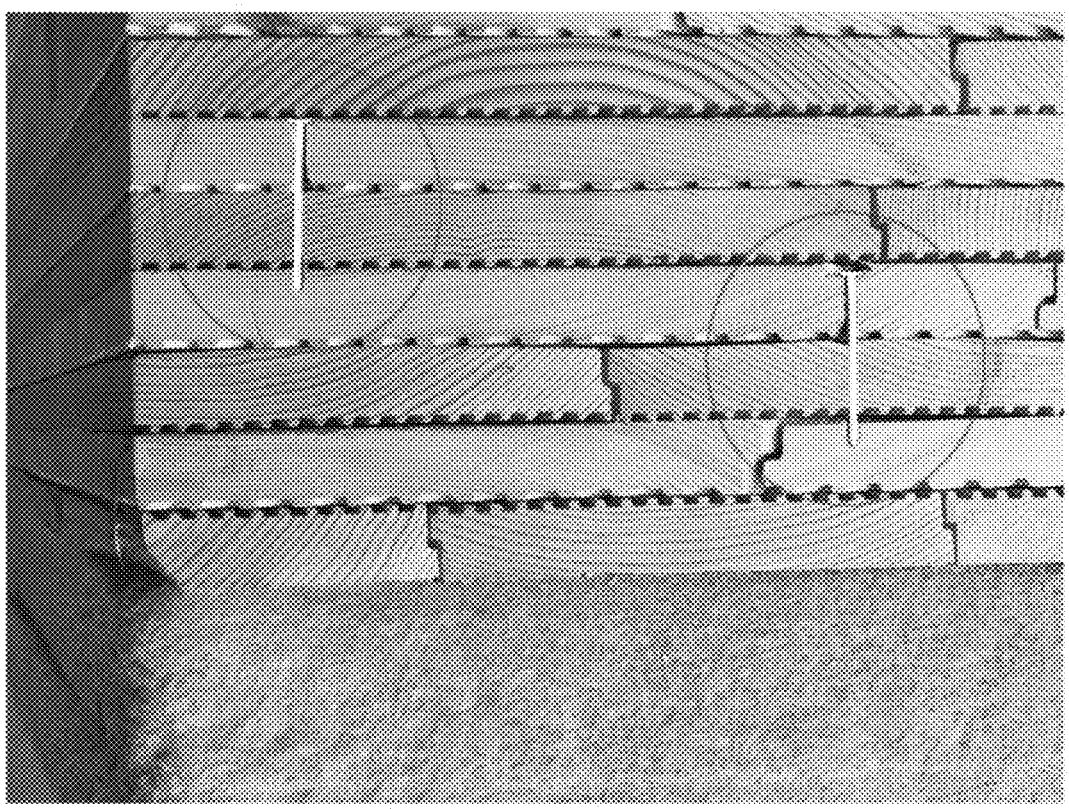
Fig. 12A - Prior Art
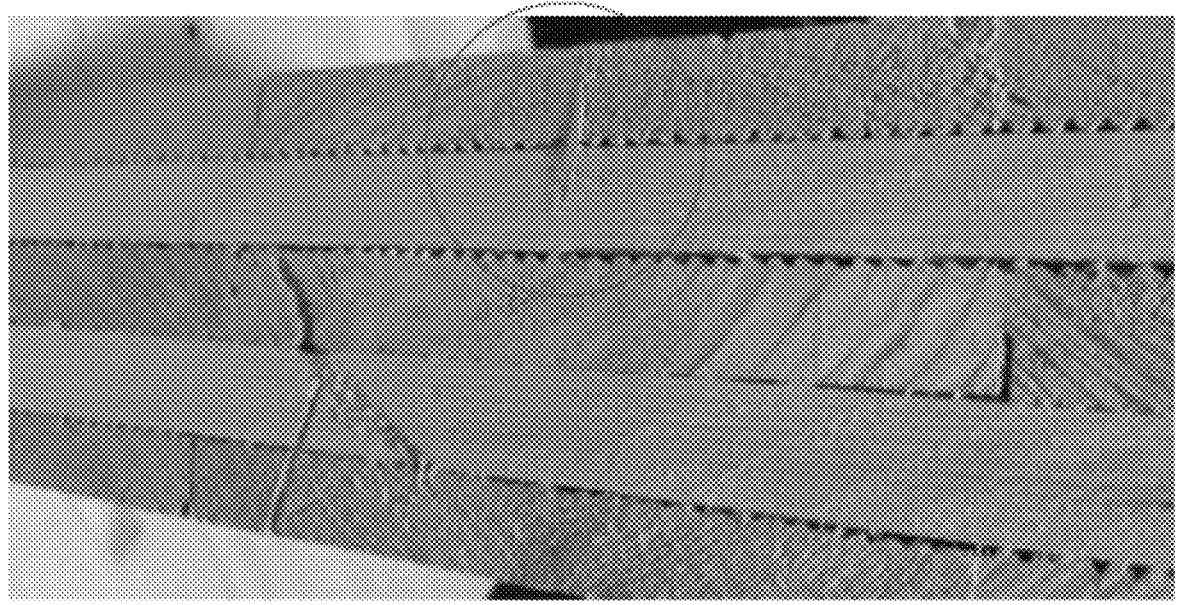
Fig. 12B - Prior Art

WOODEN PANEL FOR CONSTRUCTION OF WOODEN TIMBER BUILDINGS

CROSS-REFERENCE TO RELATED APPLICATIONS

This application claims the benefit of Czech Application No. PV 2019-124, filed Feb. 28, 2019, which is hereby incorporated by reference, to the extent that it is not conflicting with the present application.

BACKGROUND INFORMATION

Field of the Invention

The invention relates generally to timber constructions, and more particularly to prefabricated air-tight wooden panels with minimum cutting losses.

State of the Art

The currently used wooden panels intended for the construction of timber structures are based on several alternative approaches. The key parameter is always the static strength of the panel and consequently the static strength of the entire house or other structures assembled from such panels. To adhere to requirements imposed by the structural analysis, wooden panels are usually made in the form of thick prefabricated elements of a rectangular or square shape that are made of several layers of wooden boards connected by nails. The individual layers of the boards are gradually put one on the top of another over the entire surface of the resulting wooden panel where each layer of the boards is rotated by 90° in respect of the previous one. To be able to process such a prefabricated panel later, nails made of materials that do not damage wood-working machines are used, in a majority of cases aluminium-based ones. However, aluminium nails have one crucial disadvantage consisting in their rather low strength. For the prefabrication of wooden panels using aluminium nails a lot of connecting material, i.e. aluminium nails, needs to be used and also a large quantity of wooden boards as the individual connections of the boards are not strong enough to meet requirements imposed on the panel in terms of static strength. Among the most frequently mechanically manufactured wooden panels connected by aluminium nails are panels with the maximum dimensions of 3.2×6 m. The maximum dimensions of the panel are limited by the parameters of the machine used for manufacture. The individual layers of the boards are first nailed together with aluminium nails applied in randomly selected positions. The resulting panel for structural walls has at least 9 layers of boards, which means that the panel is approximately 205 mm thick. The rectangular or square panel is then further processed by trimming its edges and then, based on the design of a specific house, windows, doors or other openings are cut out of the panel. Finally, groves for cables, electrical or other installations are milled out. Cutting losses of the average panel amount up to 10-30% depending on the house design. Panels connected by aluminium nails are produced, for example, by the German company Massiv Holz Mauer.

Utilization of aluminium wood screws randomly positioned within the wooden panel structure is disclosed in the European patent EP2492410 (A1).

Utilization of aluminium, brass or plastic connecting materials for the construction of prefabricated wooden panels is disclosed in the document EP 1 321 598 B1, which opts for soft connecting materials considering the subsequent processing of the wooden panels.

Aluminium-based connecting materials or materials based on other soft metals or materials that would not damage wood working machines seem to be the key limiting factor for prefabricated panels. If aluminium wood screws or nails are used, they are often distorted or even disrupted during the connection process of the boards due to the fact that wood has not the same hardness everywhere and if the wood screw or nail is installed/driven into wood in places where knots or other hard spots are, the wood screws or nails often get distorted. Distortions are rather frequent. In the case of nails, distortions occur in about 3% of all driven nails, while in the case of wood screws the figure amounts to 5%. This leads to imperfect connections that need to be taken into account within the framework of the static strength of the panel as a whole. Moreover, during the subsequent processing of the panel some nails or wood screws are cut, which means that they no longer fulfil their connecting function. With cutting losses amounting up to 10-30% of the panel surface and with X nails/wood screws needed per $m^2$, approximately 0.3 to 2% of all driven/screwed nails or wood screws are found in the site of cut. The fact that sharp edges remain in the cut connecting material and make work with the panels more difficult is not negligible either.

Connecting material consumption is another parameter of prefabricated panels. Considering the fact that aluminium wood screws have a 3.5 times lower value of the plastic moment of buckling resistance compared to steel wood screws, the correspondingly greater quantity of aluminium wood screws compared to steel ones must be used. However, steel wood screws cannot be used in the aforementioned panels due to the fast destruction of wood-working machines.

Another option available for connecting individual boards into wooden panels is gluing. Individual layers of boards are glued together to form a prefabricated panel with a rectangular or square shape. Connecting boards by adhesive is unattractive from environmental as well as toxicological points of view. In an overwhelming majority of cases the used adhesive is not biodegradable, which compromises the environmental value of the whole panel and consequently that of the whole house. Moreover, adhesives contain solvents that gradually evaporate from panels. Although a majority of glued prefabricated wooden panels meet the level of adhesive solvent fumes that is regulated by legislation, some solvent fumes are always present and the consequences of permanent exposure to small doses of solvents have not been ascertained yet. Panels based on specific requirements are then cut out of the glued prefabricated wooden panels and all waste resulting from cutting losses is disposed of.

The document EP 2492410 discloses a wooden panel connected by randomly positioned aluminium or plastic wood screws where the panel is comprised of at least three layers of wooden planks. Woods screws made of soft material are preferred with a view to preventing damage to the cutting tool, i.e. saw, used for the subsequent shaping of the panel—cutting out windows, doors, inclined planks, etc. All cutting losses resulting from shaping account for waste material. Such waste material also includes a large quantity of connecting material degrading wood as raw material for further processing. Waste material can be utilized as ground and compressed fuel in the shape of pellets or briquettes.

The document DE 19603833 discloses a wooden panel formed by at least three layers, in a preferred embodiment by at least four layers of wooden planks or timber where individual layers are rotated by approximately 45° in respect of one another. The panels preferably include interrupted layers, i.e. layers where planks do not fit closely, meaning they have better sound insulation properties. Based on the embodiment examples, it is preferred if the panel has 7 and more layers, which implicates the use of soft connecting materials compromising static strength and necessitating the manufacture of thicker panels comprising several layers. The document discloses only the structure of the panel itself, but does not cover the cutting of windows, doors, and trimming the panels for inclined planks, etc. For panels mentioned in the D2 document, it is necessary to select connecting elements preventing damage to saws during subsequent shaping of the prefabricated panel. Moreover, all losses resulting from cutting account for waste material with limited possibilities of further use, similarly as in the document EP 2492410.

The document DE 29721848 discloses a wooden panel consisting of at least three layers of wooden planks that are glued together or connected by nails where individual layers are mutually rotated by 30-60°. The D3 document does not specify the materials of the nails and considering the fact that the document only discloses the construction of the panel itself, without dealing with cutting out windows, doors, inclined planks, etc., a person familiarized with the state of the art must conclude that nails made of material allowing cutting out openings in the panel or shaping the panel must be concerned. This means that steel is excluded as it would damage saws during cutting out and shaping.

The document US 20120135185 discloses a wooden panel for high buildings that preferably comprises at least three layers of wooden planks with always three layers screwed together. The individual layers of planks are preferably perpendicular to one another. The D4 document does not specify the material of wood screws, but only states "screws" or "metal pins" without defining the metal. The document US 20120135185 is thus similar to the document DE 29721848 and similarly as in the document DE 29721848, a person familiarized with the state of the art necessarily concludes that if steel wood screws are used in the prefabricated panels, further shaping of the panel for the purpose of the structure concerned would be utterly excluded.

The document EP 1321598 discloses a wall, ceiling or roof composite element comprised of wooden planks mutually connected by means of connection. Directly the first claim provides that the connecting elements must be workable by tools used in the wood-working industry, such as a milling tool or saw. Although the document admits using iron or steel as connecting materials, this statement is contradicted not only by the first claim but also the information in the patent description saying that wood making tools get immediately destroyed by nails made of steel pins.

It is generally understood that automated manufacture is less expensive and faster. Therefore, all wooden panels are today manufactured as prefabricates in general-purpose lengths and widths. The disadvantage of this general-purpose approach is the necessity to use soft connecting elements, ideally aluminium, to allow the general-purpose panels to be subsequently shaped and cut out to meet the requirements of a specific customer without destructing saws.

As mentioned above, an important parameter of prefabricated wooden panels is cutting losses. Panels are manufactured in rectangular or square shapes and all subsequent adjustments as per the construction design are implemented by cutting out, which results in large quantities of waste, 10-30% on average. Wooden waste originating from the cutting losses can no longer be used for construction. Moreover, it contains large quantities of the connecting material, usually aluminium, which excludes its biological recycling. In the case of glued panels, wood resulting from cutting losses contains a large quantity of adhesive. Waste resulting from cutting losses is usually directly burnt or ground to small pieces and compressed into briquettes to be used as fuel.

The environmental value of the panel is thus reduced not only by the used connecting material but also by the quantity of wood lost due to cutting out and its subsequent disposal.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

DESCRIPTION OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Composed structure, steel wood screws, zero cutting losses, zero waste, materials savings.

Demonstration in the panel properties: approximately double buckling resistance and up to 82% savings of material.

Waste-less cut-less composed wooden panel for a wooden timber buildings construction has been created; the panel retains the buckling resistance of the previously used wooden panels and spares up to 82% of wooden material while generating no waste. This panel is already during manufacture provided with the required openings and or depressions without the necessity of their subsequent cutting out; the final shape of the panel is taken into account, or the pattern of openings prepared in the panel respectively, thus allowing much better, in terms of quality and static strength, connecting material to be used as it is not necessary to consider connecting material that can be cut when openings are being cut out.

During the development of the waste-less cut-less panel, emphasis was also on a buckling resistance of the panel and the dependence of the technological parameters of the panel on the buckling resistance of the panel was determined. The basic static element of the panel construction was determined to be a static core of the panel, which has up to double static resistance-buckling resistance—when using steel screws as connecting elements for wooden slats composed together to form the panel, compared to conventional aluminium screws as connecting elements. Wooden panel, namely its static core, is a composite building material, made up of thin profiles to achieve the highest buckling resistance with the lowest possible material consumption. E.g. With a buckling resistance more than 70 kN in three meters of height and one meter of width at panel thickness 81 mm, namely thickness of the static core. Other example of the panel shows, that even 19 mm thin planks can form a static core with buckling resistance more than 45 kN in three meters of height and one meter of width, namely three layers of planks 19 mm thick, 170 mm or 120 or 80 mm wide connected with variating amount of steel screws—according to examples 1G, H, J.

However, this is only possible while solving several technical problems and overcoming technical prejudice. It is necessary to reverse the manufacturing process over the prior art. The precise design of the waste-less cut-less wooden panel must first be designed and manufactured accordingly, since the panel cannot be machined through the steel screws connection points. It is not possible to produce a general panel wall and then cut through the required panel, because of the steel screws.

Buckling resistance was related to the static core of the panel, which can be repeated several times in one panel and thus increase the overall buckling resistance of the panel. Preferably, the individual static cores are interconnected through another layer of planks or directly. Preferably, additional individual planks layers are attached to the static core to slightly increase the buckling resistance. Thickness or width of these additional layers is not limited, for example: decking or board can be used as a visual interior layer.

Openings in the panel are created in individual layers, which means that shorter planks are used along the opening and followed by free space in the layer for the future opening with planks laid down again away from the end of the planned opening. The exact dimensions of the planned opening may not be strictly adhered to, planks may lap over the opening where necessary as the connecting materials, being steel wood screws, are positioned only in places where solid space of the panel is planned in the projection patterns according to crossings of the planks. Such overlaps are then easily cut off without saw collisions with the steel wood screws that could damage the saw.

To compare the most relevant state of the art related to the currently manufactured wooden panels, structural analysis was performed on a model three-layer panel with a thickness of one layer 27 mm and width of planks 170 mm with dimensions of the panel 1,000 mm of wide and 3,000 mm of high, where the following connecting material was used: a) an aluminium wood screw Euroviti VITE 5×71 mm HILO with the connection slip factor of 773.42 Nmm. And our waste-less cut-less composed wooden panel, where the used connecting material was b) the steel wood screw Würth ASSY plus VG 5×80 mm with the connection slip factor of 4,034.80 Nmm. It was discovered that for securing the same buckling resistance, in the case a) aluminium one crossing of wooden planks requires 10 aluminium wood screws, while in the case b) steel one crossing of wooden planks requires 2 steel wood screws. Another variable that plays an important role here are the required distances between individual wood screws which are not met in the case a) aluminium, where in the case a) aluminium the distance between individual wood screws is 2.77 mm, while in the case b) steel the distance is 14.45 mm.

For additional comparison of the most relevant state of the art related to the currently manufactured wooden panels, structural analysis was performed with two wood screws on the plank crossing with a modified thickness of the planks, or panel layers respectively, with the dimensions of the panel 1,000 mm of width and 3,000 mm of high, where the following connecting material was used: a) aluminium wood screw Euroviti VITE 5×71 mm HILO with the connection slip factor of 773.42 Nmm and a waste-less cut-less composed wooden panel, where the used connecting material was b) steel wood screw Würth ASSY plus VG 5×80 mm with the connection slip factor of 4,034.80 Nmm.

To maintain the same buckling resistance for the solutions a) aluminium and b) steel, it was necessary to have in the case a) aluminium a panel with a total thickness of 115 or 109 mm (acc. to example 1C and 1D) and in the case b) steel it was necessary to have a panel with the thickness of 81 mm, which means with the thickness lower by 30% with the same design buckling resistance of 99 kN.

This information was further employed to compare material consumption required for the manufacture of realistic panels with openings, namely with dimensions of 3,000×5,000 mm and 3,000×20,000 mm. It was discovered that according to the solution b) steel, while maintaining the same static parameters, the required quantity of material compared to the case a) aluminium was lower by 79% in the case of the panel with the dimensions of 3,000×5,000 mm and lower by up to 82% in the case of the panel with the dimensions of 3,000×20,000 mm. Such differences are given in particular by the use of steel wood screws, thanks to which it is not necessary for the layer of wood in the panel to be so thick. Cut out openings account for approximately 20% of a total of 80% material increase in the solution a) aluminium. Although cutting out opening, including the subsequent disposal of the nailed panels, is not a very smart solution, the total quantity (of wood) required for the manufacture of the panel with a sufficient buckling resistance with aluminium wood screws is high compared to the innovation being the waste-less cut-less composed wooden panel and with steel wood screws.

The issue of cutting losses related to prefabricated panels and their buckling resistance depending on the used connecting material is addressed by the waste-less cut-less composed wooden panel and with assembled openings.

Thanks to surmounting the technological prejudice based on the well-proven technology where wooden panels are nailed using soft connecting material to make rectangular or square shapes with subsequently trimmed edges and cut out openings for windows, doors, gates, etc., the composing of wooden planks that take into account the required appearance of the resulting panel and subsequent connecting of individual planks by steel wood screws represents unique technology.

Thanks to the fact that the panels are composed and each panel is made to measure for the house concerned, steel wood screws can be used for the construction of the wooden panel. Application of steel wood screws dramatically increases the buckling resistance of the entire wooden panel. The panel thus can be much thinner compared to prefabricated panels connected by aluminium nails—mere 81 mm is sufficient. As far as the thickness of the panel and losses related to cutting out openings for windows and doors are concerned, up to 82% of material is spared. All potential trimmings resulting from one panel are utilized for the manual assembly of the next one, which means, paradoxically, that manual work spares both the environment, and costs. The construction of the made-to-measure panel lasts longer but thanks to the enormous material saving the economics of the entire process is finally more profitable than the manufacture of prefabricated panels with subsequent adjustment.

Developing Process:

At the beginning of the development of the waste-less cut-less composed wooden panel there were several basic requirements:

buckling resistance,
the thickness of the panel corresponding with the consumption of wooden material, and
the consumption of connecting material with zero quantity of adhesive,
the speed of manufacture of the panel, including the trimming/wood working to acquire the required shape.

Buckling resistance was ensured by the use of randomly positioned steel wood screws, which also reduced the panel's thickness and the consumption of wood as well as connecting material. The problem was that with the use of randomly positioned steel wood screws it was not possible to machine the panels subsequently to have the required shapes—such as cut out openings for windows and doors. Therefore, the idea of the pattern-based arrangement of steel wood screws allowing wood-working cuts between non-randomly positioned wood screws was developed. However, it was necessary to determine the exact layout of the pattern—positioning of wood screws for each panel individually depending on the previously designed positions for windows or doors or based on the required dimensions of each panel. Thus, partly prefabricated wooden panels of rectangular or square shapes with intelligently positioned steel wood screws, the positioning of which did not interfere with the positions of future cuts, were manufactured. However, cutting losses were still high, approximately 10-30% depending on the dimensions and openings of specific wooden panels and the material resulting from the cutting losses could not be further used.

The original dogma provided that the manufacture of a machine-made panel is the fastest and most effective. However, the technology of the manufacture of panels was further developed and it turned out that the composing of individual planks with various lengths to create a panel having the required shape, where the shape as well as the size of the required panel are taken into account based on the design, together with the arrangement of openings for windows and doors, is much more effective compared to the mechanical manufacture of the panels and their subsequent wood working. The composing manufacture also generates much less waste and thanks to the possibility to use steel wood screws instead of aluminium ones, the buckling resistance of the waste-less cut-less composed wooden panel has increased enormously, not to mention the consequent significant savings of the wooden material.

From the point of view of requirements imposed on a modern house, it is very important to ensure the air tightness of the waste-less cut-less composed wooden panel. Air tightness along with vapour permeability of the waste-less cut-less composed wooden panel is achieved thanks to a vapour-barrier and/or air-tight film, being preferably paper, placed between two layers of planks. In addition, it is necessary to ensure the air tightness of the connections between individual wooden panels during the construction of the house. The connections of the panels are air-tight thanks to lining individual panels using lining air-tight material, i.e. air-tight plastic material that is preferably watertight as well. The trimmed panel is lined by the lining film, preferably an adhesive tape, along its perimeter, where the lining material covers the cutting surfaces on the side walls of the panel and preferably laps over the edges of the panel by 2 to 15 cm, i.e. laps over onto the panel surfaces. In preferred embodiments, lining is implemented by a film adhesive tape.

During the assembly of the house, the panels fit closely by the lined side walls, which ensures that the inner space of the house is closed and does not allow any free penetration of air and vapour. The lining film on the panel's side wall and the vapour-barrier film fit closely in a perpendicular direction and the overlapping portions of the lining film on the panel surface provide for a perfect closure of the vapour-barrier film inside the wall of the panel. The panel lined in this manner is assembled with the neighbouring panel and the lining films of the closed panels fit closely thus closing the inner space.

The entire process of the manufacture of the waste-less cut-less composed wooden panel and assembled openings thus always begins with a specific design with exactly situated planned openings. The decision on the positioning of steel wood screws in the pattern then depends on the openings to eliminate interference with the places of wood working. Then the specific panel is started to be manually composed by laying the first layer of wooden planks onto a substrate. Already the first layer of wooden planks follows the shape of the waste-less cut-less composed wooden panel based on the design. An air-tight vapour-permeable film, preferably paper one, which roughly follows the shape of the first layer of planks, or the shape of the waste-less cut-less composed wooden panel as per the design respectively, is laid onto the first layer of planks. The second layer of planks roughly following the shape of the first layer of planks, or the shape of the Waste-less cut-less composed wooden panel as per the design respectively, is laid onto the air-tight vapour-permeable film perpendicularly to the first layer of planks, or at an angle of 45° up to 135°. Preferably, also the third layer of planks is laid down onto the second layer of planks, either perpendicularly or at an angle of 45° up to 135°, and the third layer of planks roughly follows the shape of the first and second layers of the planks or the waste-less cut-less composed wooden panel as per the design respectively. Roughly following of the shape means that the entire required surface is covered by a layer of planks put one next to each other with potential overlaps intended for subsequent trimming to acquire the exact shape. The individual layers are connected by steel wood screws deployed in a pre-set pattern. Preferably, at least two wood screws are positioned on every crossing of planks, or in every projection pattern respectively. Preferably, four steel wood screws are positioned on every crossing of planks. Steel wood screws are preferably placed along projection patterns edges per more than four pieces per one projection pattern. Steel wood screws screwed along the edges of the waste-less cut-less composed wooden panel are always positioned at least 2 cm away from the edge as per the design to prevent contact between the steel wood screw and the wood working machine. The Waste-less cut-less composed wooden panel that now already has its rough shape, is trimmed. The edges of the panel are trimmed by cutting as are the openings in the panel. The trimmed panel is lined along its perimeter in the cut place by some lining material, preferably a paperboard film. The waste-less cut-less composed wooden panel manufactured in this way is then used for the construction of the building.

Said manufactured method is used to provide the static core either. Static core is composed from three closely fitted layers of planks with thickness of planks ranging from 19 to 35 mm and width of planks ranging from 80 to 400 mm, where planks of an external layer of the static core are placed vertically in the panel and side walls of planks of the external layers of the static core fit closely, planks placed in the same layer have the same thickness and layers of the planks are connected by steel wood screws placed in at least two pieces in each projection pattern.

The static core can be "hide" in the panel, for example it can be covered from both sides with a cover layer, or one panel can contain more than one static core. Static core can be manufactured together with other layers of the panel according to said manufactured process, or the static core can be manufactured separately.

SUMMARY

The waste-less cut-less composed wooden panel for a wooden timber buildings construction is composed from cross laminated wooden planks, where contact walls of the planks form the contact walls of the layers. The individual layers of the panel fit closely. The planks of a second layer are laid in respect of the planks of a first layer at an angle ranging from 45° to 135°. The side walls of the planks in orthogonal projection onto the contact wall of closely fitted layers of the panel create projection patterns having a shape of quadrangles.

The waste-less cut-less composed wooden panel has at least one opening and/or at least one depression, for example for a future electroinstallation, and contains a static core with buckling resistance at least 45 kN in three meters of height and one meter of width. The static core is composed from three closely fitted layers of planks with thickness of planks ranging from 19 to 35 mm and width of planks ranging from 80 to 400 mm. Planks of an external layer of the static core are placed vertically in the panel. Side walls of planks of the external layers of the static core fit closely. Planks placed in the same layer have the same thickness. Layers of the planks are screwed together by steel wood screws placed in at least two pieces in each projection pattern.

Preferably, the thickness of the planks placed in the static core ranging from 19 to 32 mm.

Preferably the steel wood screws are placed in at least four pieces in each projection pattern.

Preferably the static core is connected with another layer(s) of planks.

Preferably the static core is screwed with another layer(s) of planks by steel wood screws.

Preferably the panel contains two static cores.

Preferably the panel contains up to 7 layers, preferably up to 5 layers.

Preferably the static cores are screwed together through another layer of planks.

Preferably the buckling resistance of the static core is at least 70 kN in three meters of height and one meter of width, where the thickness of the planks placed in the static core ranging from 25 to 30 mm and the width of the planks placed in the static core ranging from 140 to 200 mm.

A crossing of planks represents the neighbourhood of the only point where at least four planks meet in the projection in two layers by their side walls, preferably situated one on the top of the other in a perpendicular direction.

The projection pattern is created by placing the planks into layers where individual layers have different orientations, mutually rotated by 45° to 135° and their edges in individual layers then create patterns creating the projection patterns if viewed from the top, i.e. in the orthogonal projection. A crossing is thus limited by the adjacent projection patterns.

BRIEF DESCRIPTION OF THE DRAWINGS

For exemplification purposes, and not for limitation purposes, aspects, embodiments or examples of the invention are illustrated in the figures of the accompanying drawings, in which:

FIG. 3 Comparison of the buckling resistance of individual panels manufactured according to Example 1.

FIG. 4 Comparison of the airtightness of the model houses.

FIG. 5A: Comparison of the consumption of wooden material for individual panels manufactured according to Example 2.

FIG. 5B: Comparison of the consumption of wooden material for individual panels manufactured according to Example 3.

FIG. 6 Overview of examples and basic parameters of individual manufactured panels.

FIG. 12A: The state of the art. A specimen of the prefabricated panel with a cut-out opening, a visibly cut aluminium nail.

FIG. 12B: The state of the art. A specimen of the prefabricated panel with a cut-out opening, a visibly cut aluminium nail.

EXAMPLES OF INVENTION EXECUTION

Figure 1A:
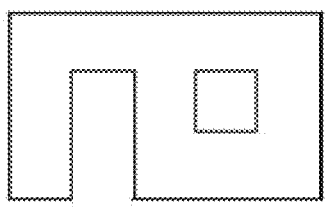
FIG. 1A: A schematic drawing of the panel with the dimensions of 5,000 mm×3,000 mm with one opening for a window and one opening for a door.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 105 and 205, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Example 1

1A. Construction of the Manually Composed Wooden Panel 5×3 m with Steel Wood Screws, Three Layers of the Panel Represent a Static Core Onto a substrate, which was a wood-working bench, the first stop of the utmost plank 5, the thickness of which was greater, approximately 90 mm, or it was greater than the sum of the thicknesses of all layers 2 of the panel 1 respectively, i.e. 81 mm, was either screwed or nailed down. Parallel to the edge of the first stop of the utmost plank 5 the second stop of the utmost plank 5 was positioned and the length of the space delimited by these two stops was exactly 5,200 mm. Between the stops were gradually and freely laid/positioned, one next to the other, 26 wooden planks 5 with the length of 3,100 mm, width of 200 mm and thickness of 27 mm. These planks 5 formed the first layer 2 of the manually composed wooden panel 1 and at the same time these planks 5 formed the first layer 2 of a static core 14 of the panel 1. Onto the first laid down layer 2 of the planks 5, the air-tight, wind- and vapour-barrier film 9 increasing the air tightness of the panel 1 was placed. Perpendicularly to the planks 5 forming the first layer 2, planks 5 of the second layer 2 with the width of 200 mm and the thickness of 27 mm were placed. The length of the planks 5 of the second layer 2 was different and differently long planks 5 were positioned one next to the other to make a row the final length of which was more than 5,100 mm and less than 5,300 mm. In the second layer 2 of the planks 5 also short or cut out planks 5 from other manually composed panels 1 were used. Perpendicularly to the placed planks 5 of the second layer 2, parallel to the placed planks 5 of the first layer 2, a total of 26 planks 5 of the third layer 2 with the length of 3,100 mm, width of 200 mm, and thickness of 27 mm were laid down from one stop to the other stop. The composed three layers 2 of planks 5 formed the static core 14 of the panel 1.

Figure 2A:
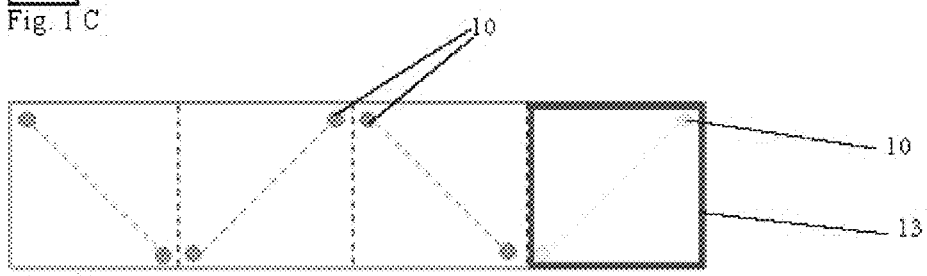
FIG. 2A: Positioning of two wood screws in the pattern, or two wood screws on the crossing respectively.
Figure 2B:
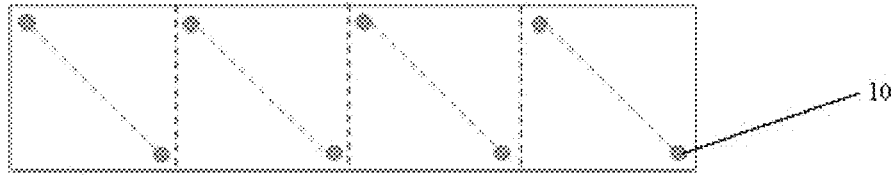
FIG. 2B: Positioning of two wood screws in the pattern, or two wood screws on the crossing respectively.

The manually positioned planks 5 of all layers 2 were screwed together by steel wood screws 10 with flat heads and with the length of 80 mm. The wood screws 10 were deployed in a pattern where on each crossing 12 of the planks 5 two steel wood screws 10 were used and/or two steel wood screws 10 were used in each projection pattern 13, which was created by orthogonal projection onto the contact wall 6 of the plank 5, of the side walls 7 of each plank 5. Other steel wood screws 10 closed the panel 1 20 mm away from the edge of the panel 1 according to the design. The positions of the wood screws 10 in the pattern are shown in FIGS. 2A and 2B. The screwed waste-less cut-less composed wooden panel 1 was trimmed by cutting off the side walls 11 of the panel 1 to the final dimensions 5,000 mm×3,000 mm. In the last step, the side walls 11 of the panel 1 were lined by the lining film 8, where the air-tight and water-tight lining film 8 closed the cutting side wall 11 of the panel 1 and lapped over the surface 4 of the panel 1 on both sides by 100 mm. By this step, the entire panel with the vapour- and wind-barrier film was perfectly closed.

Buckling resistance of the panel 1 manufactured accordingly to example 1A is 305.973 kN.

1B. Construction of the Manually Composed Wooden Panel 1×3 m with Steel Wood Screws, Three Layers of the Panel Represent a Static Core Similarly to Example 1A, a waste-less cut-less composed wooden panel 1 with three layers 2, with a thickness 27 mm each, with the width of the planks 5 of 170 mm and with the dimensions of the panel 1 1,000×3,000 mm was manufactured, where always two steel wood screws 10 with the length of 80 mm were used for each crossing 12 of the planks 5, or in each projection pattern 13 respectively.

Buckling resistance of the panel 1 manufactured accordingly to example 1B is 72.492 kN.

1C. Construction of the Wooden Panel 1×3 m with Aluminium Wood Screws, the State of the Art, Three-Layer One A wooden panel 1 with three layers 2, with a thickness 38.4 mm each, with the width of the planks 5 of 170 mm and with the dimensions of the panel 1 of 1,000×3,000 mm was manufactured, where always two aluminium wood screws with the length of 110 mm were used for each crossing 12 of the planks 5, or in each projection pattern 13 respectively.

1D. Construction of the Wooden Panel 1×3 m with Aluminium Wood Screws, the State of the Art, Three-Layer One A wooden panel 1 with three layers 2 was manufactured, where the thicknesses of individual layers 2 were 41.3 mm, 27 mm, and 41.3 mm, with the width of the planks 5 of 170 mm and with the dimensions of the panel 1 of 1,000×3,000 mm was manufactured, where always two aluminium wood screws of the length of 105 mm were used for each crossing 12 of the planks 5, or in each projection pattern 13 respectively.

1E. Construction of the Wooden Panel 1×3 m with Aluminium Wood Screws, the State of the Art, Three-Layer One A wooden panel 1 with three layers 2, with a thickness 27 mm each, with the width of the planks 5 of 170 mm and with the dimensions of the panel 1 of 1,000×3,000 mm was manufactured, where always two aluminium wood screws with the length of 80 mm were used for each crossing 12 of the planks 5, or in each projection pattern 13 respectively.

1F. Construction of the Manually Composed Wooden Panel 5×5 m with Steel Wood Screws, Three Layers of the Panel Represent a Static Core Similarly to Example 1A, a waste-less cut-less composed wooden panel 1 with three layers 2, with a thickness 27 mm each, with the width of the planks 5 of 170 mm and with the dimensions of the panel 1 5,000×5,000 mm was manufactured, where always two steel wood screws 10 with the length of 80 mm were used for each crossing 12 of the planks 5, or in each projection pattern 13 respectively.

Buckling resistance of the panel 1 manufactured accordingly to example 1F is 232.779 kN.

1G. Construction of the Manually Composed Wooden Panel 1×3 m with Steel Wood Screws, Three Layers of the Panel Represent a Static Core Similarly to Example 1A, a waste-less cut-less composed wooden panel 1 with three layers 2, with a thickness 19 mm each, with the width of the planks 5 of 170 mm and with the dimensions of the panel 1 1,000×3,000 mm was manufactured, where always two steel wood screws 10 with the length of 55 mm were used for each crossing 12 of the planks 5, or in each projection pattern 13 respectively.

Buckling resistance of the panel 1 manufactured accordingly to example 1G is 45.289 kN.

1H. Construction of the Manually Composed Wooden Panel 1×3 m with Steel Wood Screws, Three Layers of the Panel Represent a Static Core Similarly to Example 1A, a waste-less cut-less composed wooden panel 1 with three layers 2, with a thickness 19 mm each, with the width of the planks 5 of 120 mm and with the dimensions of the panel 1 1,000×3,000 mm was manufactured, where always four steel wood screws 10 with the length of 55 mm were used for each crossing 12 of the planks 5, or in each projection pattern 13 respectively.

Buckling resistance of the panel 1 manufactured accordingly to example 1H is 45.370 kN.

1I. Construction of the Manually Composed Wooden Panel 1×3 m with Steel Wood Screws, Three Layers of the Panel Represent a Static Core Similarly to Example 1A, a waste-less cut-less composed wooden panel 1 with three layers 2, with a thickness 29.5 mm each, with the width of the planks 5 of 400 mm and with the dimensions of the panel 1 1,000×3,000 mm was manufactured, where always two steel wood screws 10 with the length of 55 mm were used for each crossing 12 of the planks 5, or in each projection pattern 13 respectively.

Buckling resistance of the panel 1 manufactured accordingly to example 1I is 45.278 kN.

1J. Construction of the Manually Composed Wooden Panel 1×3 m with Steel Wood Screws, Three Layers of the Panel Represent a Static Core Similarly to Example 1A, a waste-less cut-less composed wooden panel 1 with three layers 2, with a thickness 19 mm each, with the width of the planks 5 of 80 mm and with the dimensions of the panel 1 1,000×3,000 mm was manufactured, where always two steel wood screws 10 with the length of 55 mm were used for each crossing 12 of the planks 5, or in each projection pattern 13 respectively.

Buckling resistance of the panel 1 manufactured accordingly to example 1J is 65.654 kN.

Example 2

2A. Construction of the Waste-Less Cut-Less Composed Wooden Panel, 5×3 m, with Openings for Window and a Door, Steel Wood Screws, Three Layers of the Panel Represent a Static Core Onto a substrate, which was a wood-working bench, the first stop of the utmost plank 5, the thickness of which was greater, approximately 90 mm, or it was greater than the sum of the thicknesses of all layers 2 of the panel 1 respectively, was either screwed or nailed down. Parallel to the edge of the first stop of the utmost plank 5 the second stop of the utmost plank 5 was positioned and the length of the space delimited by these two stops was exactly 5,100 mm. Between the stops were gradually and freely laid/positioned, one next to the other, wooden planks 5 with the width of 200 mm and the thickness of 27 mm, where the length of the planks 5 was selected depending on their position. Behind the stop, five standard planks 5 with the length of 3,100 mm were positioned; then, according to the design, an opening for a door with the dimensions of 1,000 mm×2,100 mm was to be situated. Therefore, four shortened planks 5 with the length greater than 1,000 mm and smaller than 1,300 mm flush with the "upper" side wall 11 of the panel 1 were placed. In addition, seven standard planks 5 with the length of 3,100 mm were placed and then, according to the design, an opening for a window with the dimensions of 1,000 mm×1,000 mm, positioned 1,100 mm away from the "lower" side wall 11 of the panel 1 was to be situated. Therefore, instead of four standard planks 5, eight shortened planks 5 were placed, of which four shortened planks 5 with the length exceeding 1,000 mm and shorter than 1,200 mm were flush with the "upper" side wall 11 of the panel 1 and four shortened planks 5 with the length exceeding 1,200 mm and shorter than 1,400 mm were flush with the "lower" side wall 11 of the panel 1. In addition, five standard planks 5 with the length of 3,100 mm were positioned. These planks 5 formed the first layer 2 of the waste-less cut-less composed wooden panel 1 and at the same time these planks 5 formed the first layer 2 of a static core 14 of the panel 1. A schematic drawing of the panel 1 with the dimensions of 5,000 mm×3,000 mm with one opening for a window and one opening for a door is provided in FIG. 1A. Perpendicularly to the planks 5 forming the first layer 2, planks 5 of the second layer 2 with the width of 200 mm and the thickness of 27 mm were positioned. The length of the planks 5 of the second layer 2 was different and the planks 5 with a different length were laid one next to another so that the final length of the first five planks 5 positioned away from the "upper" side wall 11 of the panel 1 was greater than 5,100 mm and did not exceed 5,300 mm. Then, the shortened planks 5 were positioned to follow the shape of the first layer 2 of the planks 5, or the shape of the panel 1 according to the design respectively. Onto the second layer 2 of the planks 5, the wind- and vapour-barrier film 9 increasing the air tightness and decreasing the vapour barrier of the panel 1 was placed. Perpendicularly to the positioning of the planks 5 of the second layer 2, parallel to the positioning of the planks 5 of the first layer 2, the planks 5 of the cover layer 2 with the width of 200 mm and the thickness of 27 mm were laid down from one stop to the other to follow the shape of the first two layers 2 of the planks 5, or the shape of the panel 1 according to the design respectively. In all layers 2 of the planks 5 also short or cut out planks 5 from other manually composed panels 1 were used for manual placement around the openings for a window and a door. The composed three layers 2 of planks 5 formed the static core 14 of the panel 1.

The manually positioned planks 5 of all layers 2 were screwed together by steel wood screws 10 with flat heads and with the length of 80 mm. The wood screws 10 were positioned in the pattern where for each crossing 12 of the planks 5, or in each projection pattern 13 respectively, where no subsequent wood working of the panel 1 was planned, two steel wood screws 10 were used. In addition, the wood screws 10 closed the panel 1 along its edges on each crossing 12 of the planks 5, 20 mm from the side wall 11 of the panel 1 according to the design. In the last step, the side walls 11 of the panel 1 were lined by the lining film 8, where the air-tight and water-tight lining film 8 closed the cutting side wall 11 of the panel 1 with no overlap. By this step, the entire panel with the vapour- and wind-barrier film was perfectly closed.

Buckling resistance of the panel 1 manufactured accordingly to example 2A with neglected openings is 362.461 kN.

2B. Construction of the Wooden Panel 5×3 m with a Cut-Out Window and a Door, Aluminium Wood Screws, the State of the Art, Three-Layer One A wooden panel 1 with three layers 2, with a thickness 38.4 mm each, with the width of the planks 5 of 200 mm and with the dimensions of the panel 1 of 5,000×3,000 mm was manufactured, where always two aluminium wood screws with the length of 110 mm were used for each crossing 12 of the planks 5, or in each projection pattern 13 respectively. Then, two openings were cut out in the panel 1, one with the dimensions of 1,000 mm×2,100 mm and the other with the dimensions of 1,000 mm×1,000 mm.

2C. Construction of the Wooden Panel 5×3 m with a Cut Out Window and a Door, Aluminium Wood Screws, the State of the Art, Three Layers A wooden panel 1 with three layers 2 was manufactured, where the thicknesses of individual layers 2 were 41.3 mm, 27 mm, and 41.3 mm, with the width of the planks 5 of 200 mm and with the dimensions of the panel 1 of 5,000×3,000 mm, where always two aluminium wood screws of the length of 105 mm were used for each crossing 12 of the planks 5, or in each projection pattern 13 respectively. Then, two openings were cut out in the panel 1, one with the dimensions of 1,000 mm×2,100 mm and the other with the dimensions of 1,000 mm×1,000 mm.

2D. Construction of the Wooden Panel 5×3 m with a Cut Out Window and a Door, Steel Wood Screws, Similarly to Example 2A, a waste-less cut-less composed wooden panel 1 with one static core 14 and two external layers 2 with thickness 35 mm and with one internal layer 2 with thickness 19 mm, where the width of the planks 5 of 170 mm and with the dimensions of the panel 1 of 5,000× 3,000 mm. Always four steel wood screws 10 with the length of 80 mm were used for each crossing 12 of the planks 5, or in each projection pattern 13 respectively.

Buckling resistance of the panel 1 manufactured accordingly to example 2D with neglected openings is 702.378 kN.

2E. Construction of the Wooden Panel 5×3 m with a Cut Out Window and a Door, Steel Wood Screws, the Middle Layer 45°, Three Layers of the Panel Represent a Static Core Similarly to Example 2A, a waste-less cut-less composed wooden panel 1 with three layers 2 of the thickness of 19 mm was manufactured, with the width of the planks 5 of 400 mm and with the dimensions of the panel 1 of 5,000×3,000 mm. At an angle of 45° in respect of the position of the planks 5 of the first layer 2 the planks 5 of the second layer 2 were laid down. The third layer 2 of the planks 5 was placed parallel to the planks 5 of the first layer 2. Always two steel wood screws 10 with the length of 55 mm were used for each crossing 12 of the planks 5, or in each projection pattern 13 respectively.

Buckling resistance of the panel 1 manufactured accordingly to example 2E with neglected openings is 69.625 kN.

2F. Construction of the Wooden Panel 5×3 m with a Cut Out Window and a Door, Steel Wood Screws, Seven Layers, Two Static Cores, One Connecting Layer Similarly to Example 2A, a waste-less cut-less composed wooden panel 1 with seven layers 2 was manufactured, where the thicknesses of individual layers 2 were 19 mm, 32 mm, 19 mm, 19 mm, 27 mm, 27 mm and 27 mm, with the width of the planks 5 of 80 mm, 80 mm, 80 mm, 170 mm, 200 mm, 200 mm and 200 mm and with the dimensions of the panel 1 of 5,000×3,000 mm. At an angle of 135° in respect of the position of the planks 5 of the first layer 2 the planks 5 of the second layer 2 were laid down. The third layer 2 of the planks 5 was placed parallel to the planks 5 of the first layer 2. Always two steel wood screws 10 with the length of 80 mm were used for each crossing 12 of the planks 5, or in each projection pattern 13 respectively.

The fourth connecting layer 2 of the planks 5 was placed at 90° to the planks 5 of the third layer 2. Always two steel screws 10 with a length of 30 mm were used for each crossing 12 of the planks 5 in the opposite orientation of the screw pattern according to screw pattern of the first static core 14 to avoid the screws coming in touch.

The fifth layer 2 of the planks 5 was laid parallel to the planks 5 of the first layer 2. The sixth layer 2 of the planks 5 was placed at 135° to the planks 5 of the fifth layer 2. The seventh layer 2 of the planks 5 was placed parallel to the planks 5 of the first layer 2. Always two steel screws 10 with a length of 90 mm were used on each crossing of 12 of the planks 5 of the last three layers 2 of the panel 1 forming the second static core 14 in a screw pattern orientation identical to the screw pattern orientation of the first static core 14.

Buckling resistance of the panel 1 manufactured accordingly to example 2F with neglected openings is approximately 1,000 kN.

2G. Construction of the Wooden Panel 5×3 m with a Cut Out Window and a Door, Steel Wood Screws, Plankfive Layers, One Static Core Similarly to Example 2A, a waste-less cut-less composed wooden panel 1 with five layers 2 was manufactured, where the thicknesses of individual layers 2 were 15 mm, 22 mm, 25 mm, 22 mm and 15 mm, with the width of the planks 5 of 200 mm, plank and with the dimensions of the panel 1 of 5,000×3,000 mm.

The layers 2 of the planks 5 of 22 mm, 25 mm and 22 mm form a static core 14 of the panel 1, the layers 2 having a thickness of 22 mm being oriented vertically and the layer 2 having a thickness of 25 mm being oriented horizontally. The two layers 2 of the planks 5 with a thickness of 15 mm are positioned horizontally as ornamental, rotated 90° to the vertical layers 2 of the static core 14. Always four steel wood screw 10 with the length of 95 mm were used for each crossing 12 of the planks 5, or in each projection pattern 13 respectively.

Buckling resistance of the panel 1 manufactured accordingly to example 2G with neglected openings is approximately 400 kN.

Example 3

Figure 1B:
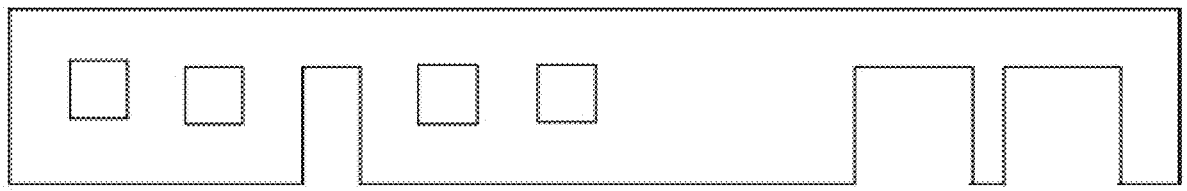
FIG. 1B: A schematic drawing of the panel with the dimensions of 20,000 mm×3,000 mm with two openings for windows, one opening for a door, with two more openings for windows and with two openings for the garage gate.
Figure 1C:
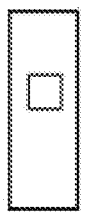
FIG. 1C: A schematic drawing of the panel with the dimensions of 1,000 mm×3,000 mm with one opening for a small window.

3A. Construction of the Waste-Less Cut-Less Composed Wooden Panel, 20×3 m, with Openings for Windows, a Door, and a Garage Gate, Steel Wood Screws, Three Layers, One Static Core Onto a substrate, which was a wood-working bench, the first stop of the utmost plank 5, the thickness of which was greater, approximately 90 mm, or it was greater than the sum of the thicknesses of all layers 2 of the panel 1 respectively, was either screwed or nailed down. Parallel to the edge of the first stop of the utmost plank 5 the second stop of the utmost plank 5 was positioned and the length of the space delimited by these two stops was exactly 20,000 mm. Between the stops were gradually and freely laid/positioned, one next to the other, wooden planks 5 with the width of 300 mm and the thickness of 27 mm, where the length of the planks 5 was selected depending on their position. Behind a stop, four standard planks 5 with the length of 3,100 mm were placed. According to the design, then two openings for windows with the dimensions of 1,000 mm×1,000 mm were to be positioned 1,100 mm away from the "lower" side wall 11 of the panel 1 at a mutual distance of 1,000 mm. In addition, an opening for a door with the dimension of 1,000 mm×2,100 mm was to be positioned, and again, two openings for windows, all the aforementioned at a mutual distance of 1,000 mm. Fifteen standard planks 5 with the length of 3,100 mm were further placed and then, according to the design, two openings for a garage gate with the dimensions of 2,000 mm×2,000 mm were to be positioned at a mutual distance of 500 mm. Then another four standard planks 5 with the length of 3,100 mm were positioned. A schematic drawing of the panel 1 with the dimensions of 20,000 mm×3,000 mm with two openings for windows, an opening for a door, with two more openings for windows and with two openings for a garage gate is provided in FIG. 1B. All openings were manually composed from shortened planks 5 similarly as in the case of Example 2. These planks formed the first layer 2 of the waste-less cut-less composed wooden panel 1 and at the same time these planks 5 formed the first layer 2 of a static core 14 of the panel 1.

Onto the first layer 2 of the planks 5, the wind- and vapour-barrier film 9 increasing the air tightness and decreasing the vapour barrier of the panel 1 was placed. Perpendicularly to the planks 5 forming the first layer 2, planks 5 of the second layer 2 with the width of 300 mm and the thickness of 27 mm were positioned. The length of the planks 5 of the second layer 2 was different and the planks 5 with the different length were laid one next to another so that the final length of the first four planks 5 positioned away from the "upper" side wall 11 of the panel 1 was greater than 20,100 mm and did not exceed 20,300 mm. Then, the shortened planks 5 were positioned to follow the shape of the first layer 2 of the planks 5, or the shape of the panel 1 according to the design respectively. Perpendicularly to the positioning of the planks 5 of the second layer 2, parallel to the positioning of the planks 5 of the first layer 2, the planks 5 of the cover layer 2 with the width of 300 mm and the thickness of 27 mm were laid down from one stop to the other to follow the shape of the first two layers 2 of the planks 5, or the shape of the panel 1 according to the design respectively. In all layers 2 of the planks 5 also short or cut out planks 5 from other manually composed panels 1 were used for manual placement around the openings for the windows and door. The composed three layers 2 of planks 5 formed the static core 14 of the panel 1.

Figure 2C:
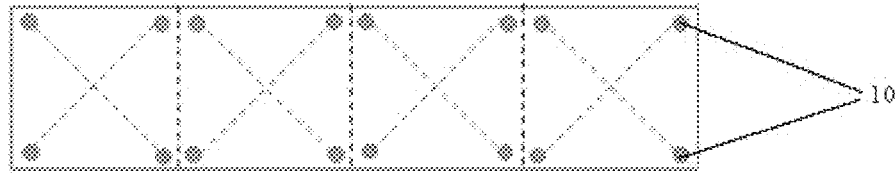
FIG. 2C: Positioning of four wood screws in the pattern, or four wood screws on the crossing respectively.
Figure 2D:
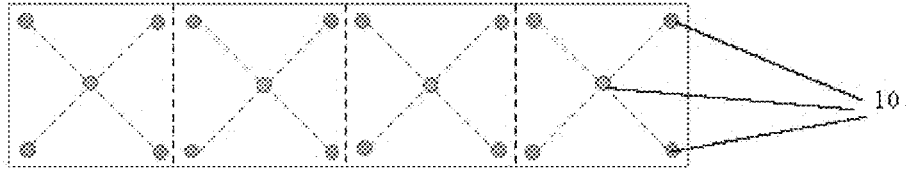
FIG. 2D: Positioning of five wood screws in the pattern, or four wood screws on the crossing and one central wood screw respectively.
Figure 7:
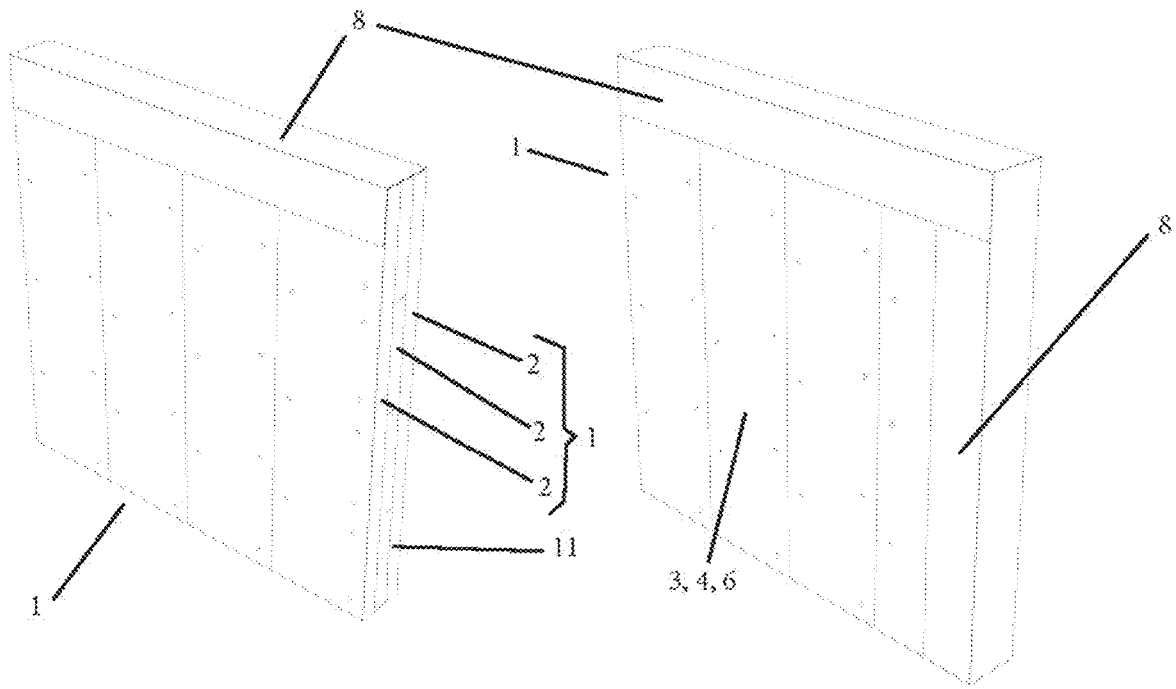
FIG. 7A: Visualization of a two-layer panel with a cover layer with lining on one side wall with an overlap into the surface of the panel.
FIG. 7B: Visualization of a two-layer panel with a cover layer with lining on two side walls with an overlap into the surface of the panel.
FIG. 7C: A schematic drawing of joining the lined panels.
Figure 7:
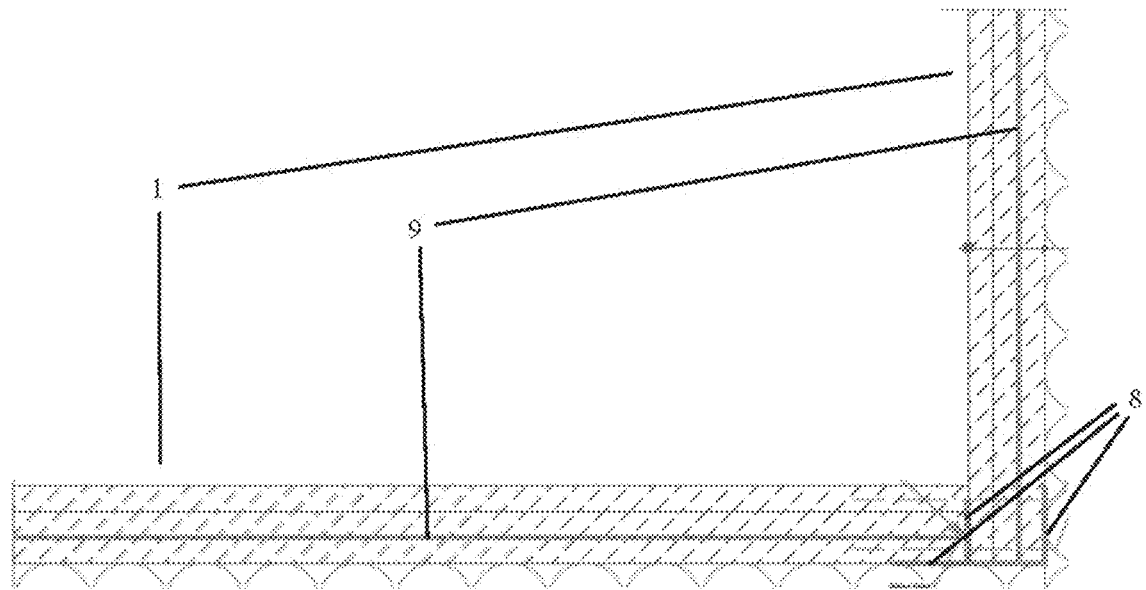
Figure 8:
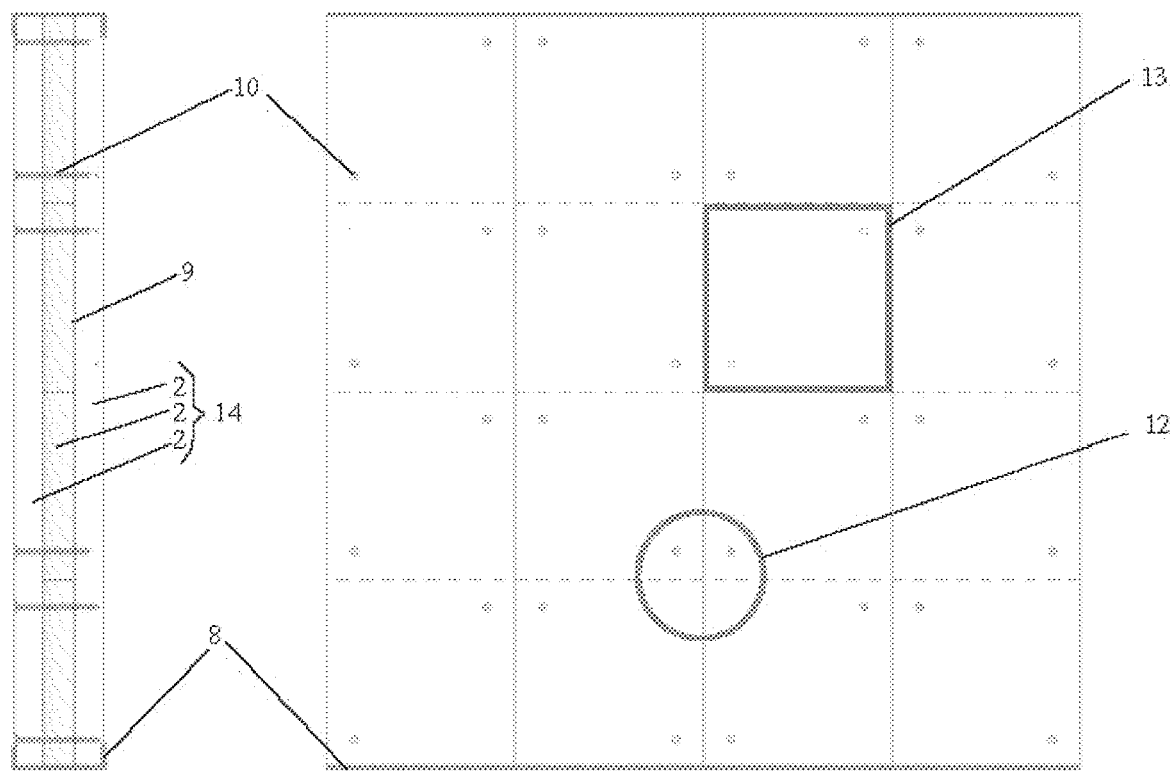
FIG. 8A: A drawing of the waste-less cut-less composed wooden panel with lining and a vapour barrier, projection patterns and crossings, the panel according to Example 1A.
FIG. 8B: A drawing of the waste-less cut-less composed wooden panel with lining and a vapour barrier, a portion of the panel according to Example 3A.
Figure 8:
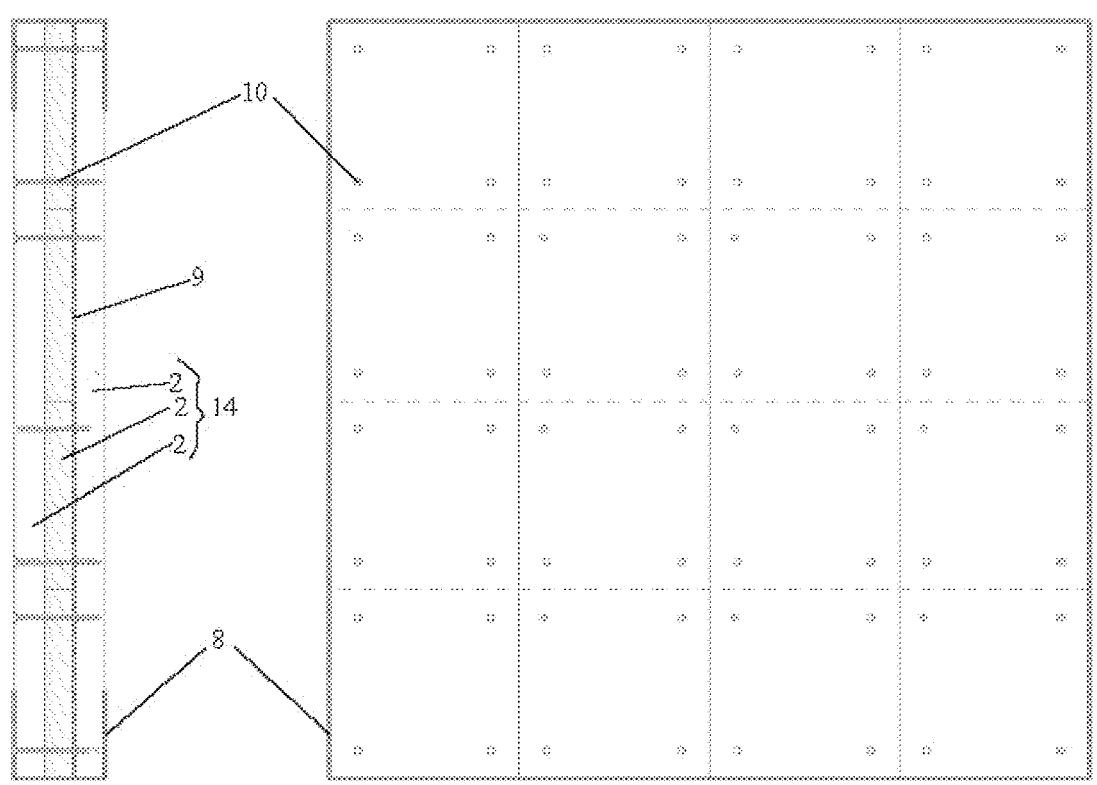
Figure 9:
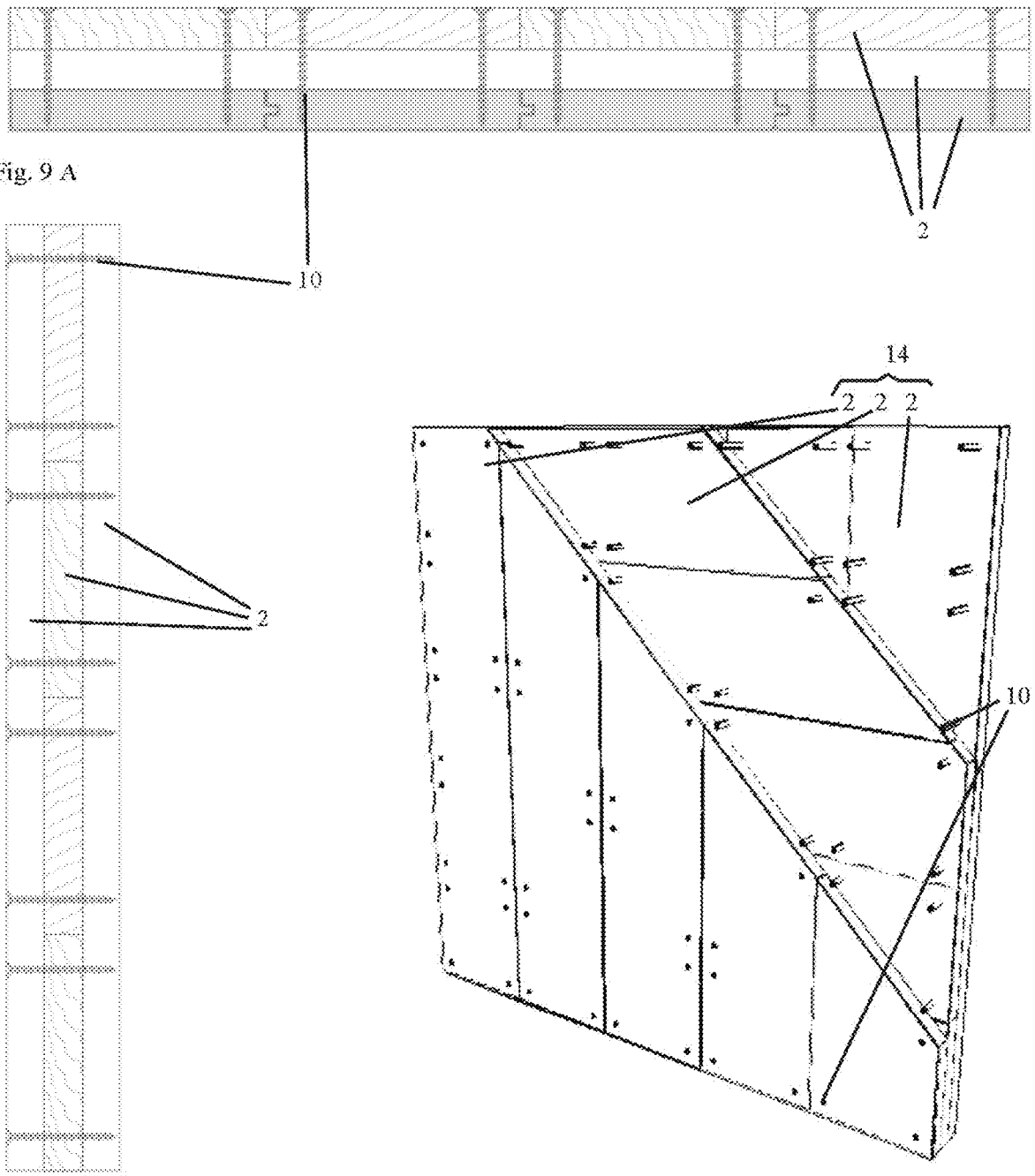
FIG. 9A: A waste-less cut-less composed wooden panel according to Example 1A, a view of the upper/lower side wall of the three-layer panel.
FIG. 9B: A waste-less cut-less composed wooden panel according to Example 1A, a view of the right/left side wall of the three-layer panel.
FIG. 9C: A waste-less cut-less composed wooden panel according to Example 1A, visualization.
Figure 10:
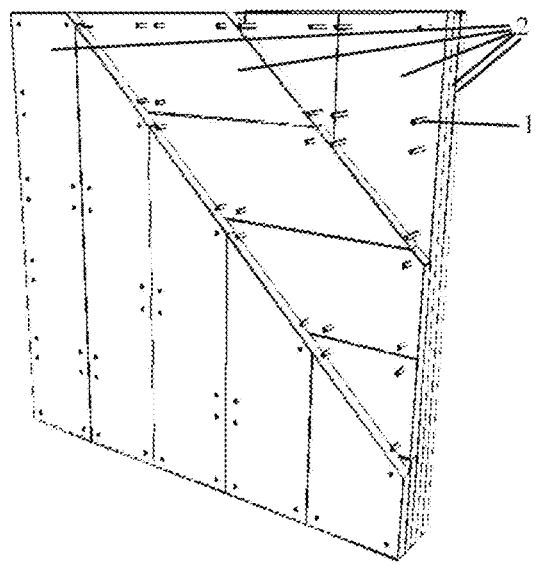
FIG. 10A: Visualization—a five-layer panel, four wood screws per projection pattern, a shift between individual layers of 90°.
FIG. 10B: Visualization of the panel—a four-layer panel, four wood screws per projection pattern, a shift between individual layers of 90°.
Figure 10:
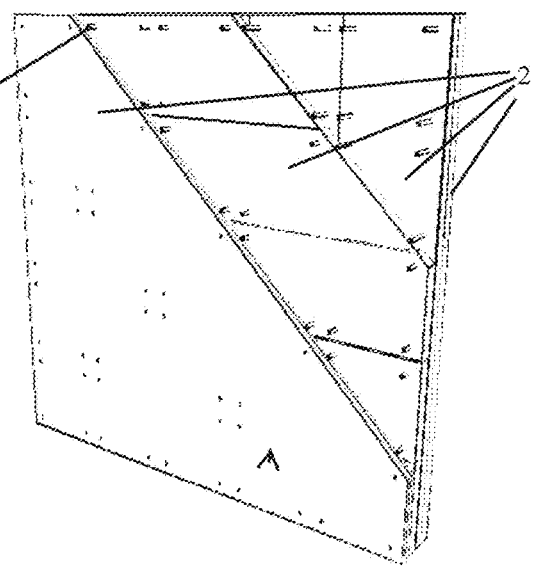
Figure 11:
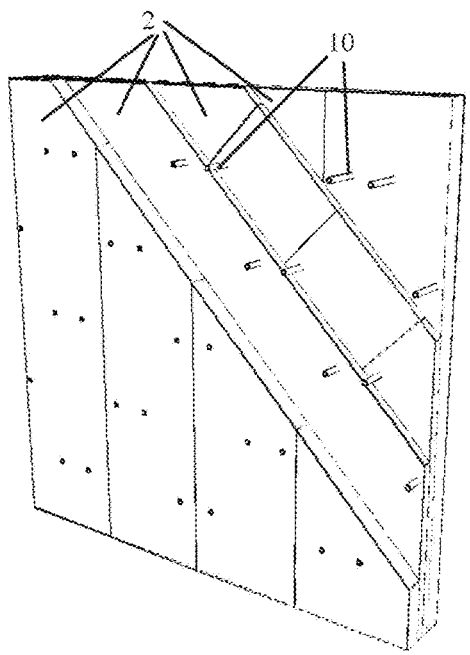
FIG. 11A: Visualization of the four-layer panel, planks placed in different layers with different wide, asymmetrically positioned wood screws—two screws per projection pattern.
FIG. 11B: A 3D model of the four-layer panel, planks placed in different layers with different wide, two screws per projection pattern, a front view, perpendicularly to the surface of the panel.
FIG. 11C: A 3D model of the four-layer panel, planks placed in different layers with different wide, two screws per projection pattern, a front view, diagonally.
FIG. 11D: A 3D model of the four-layer panel, planks placed in different layers with different wide, two screws per projection pattern, a side view.
Figure 11:
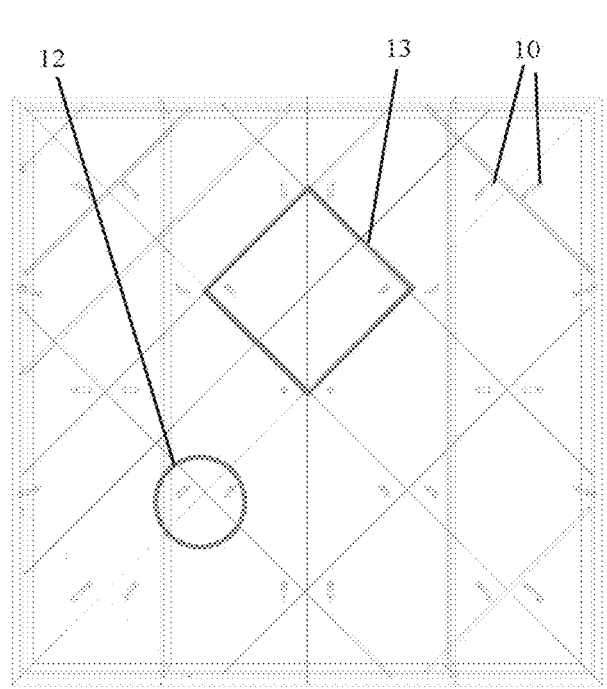
Figure 11:
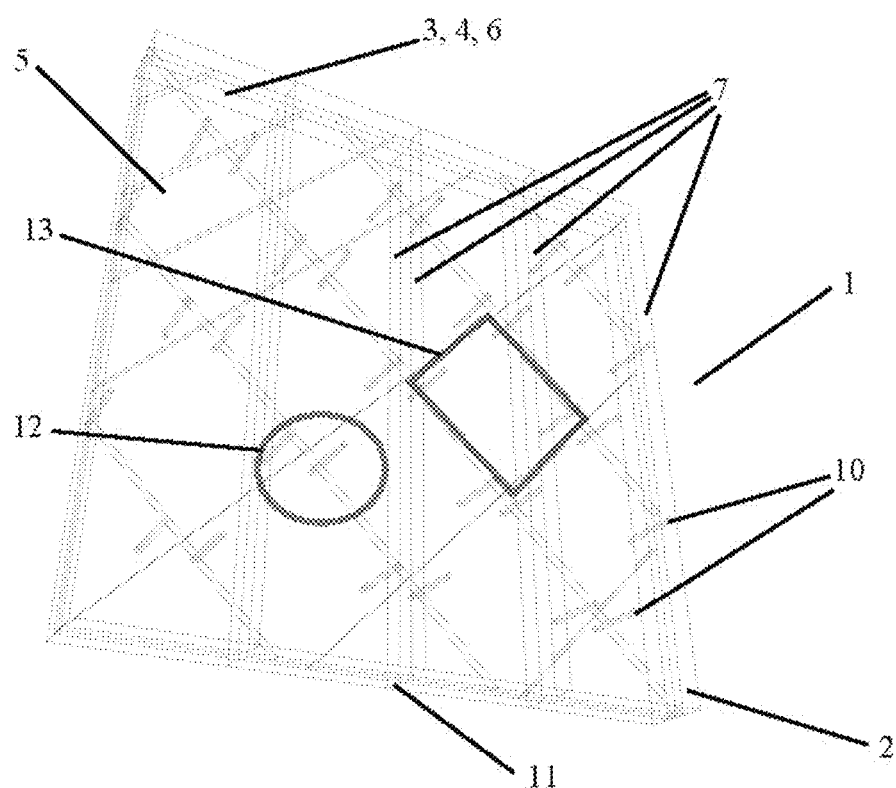
Figure 11:
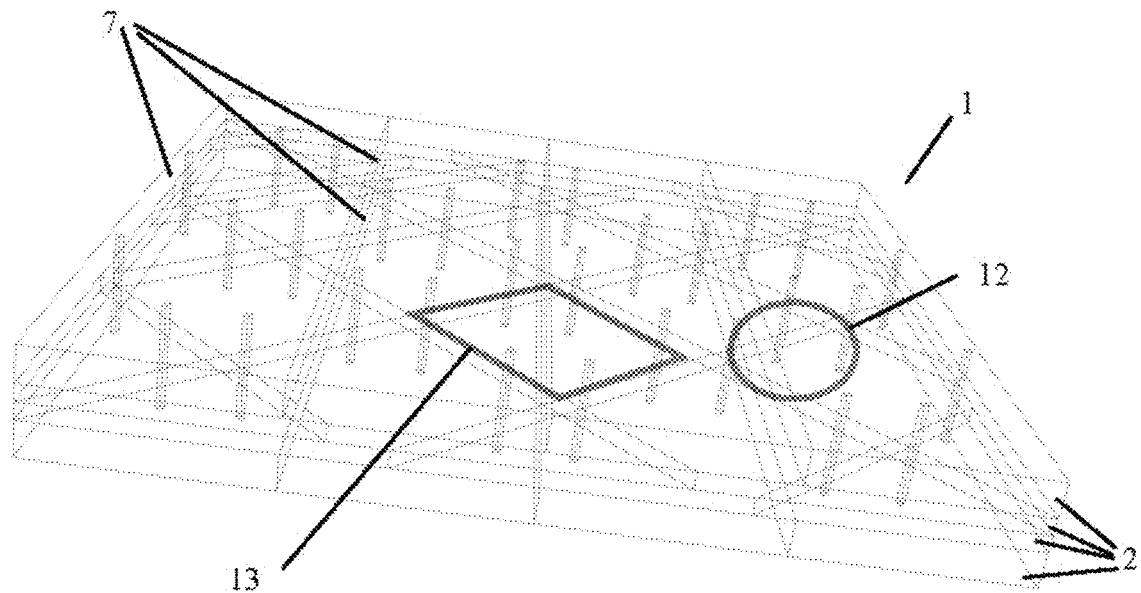
Figure 13:
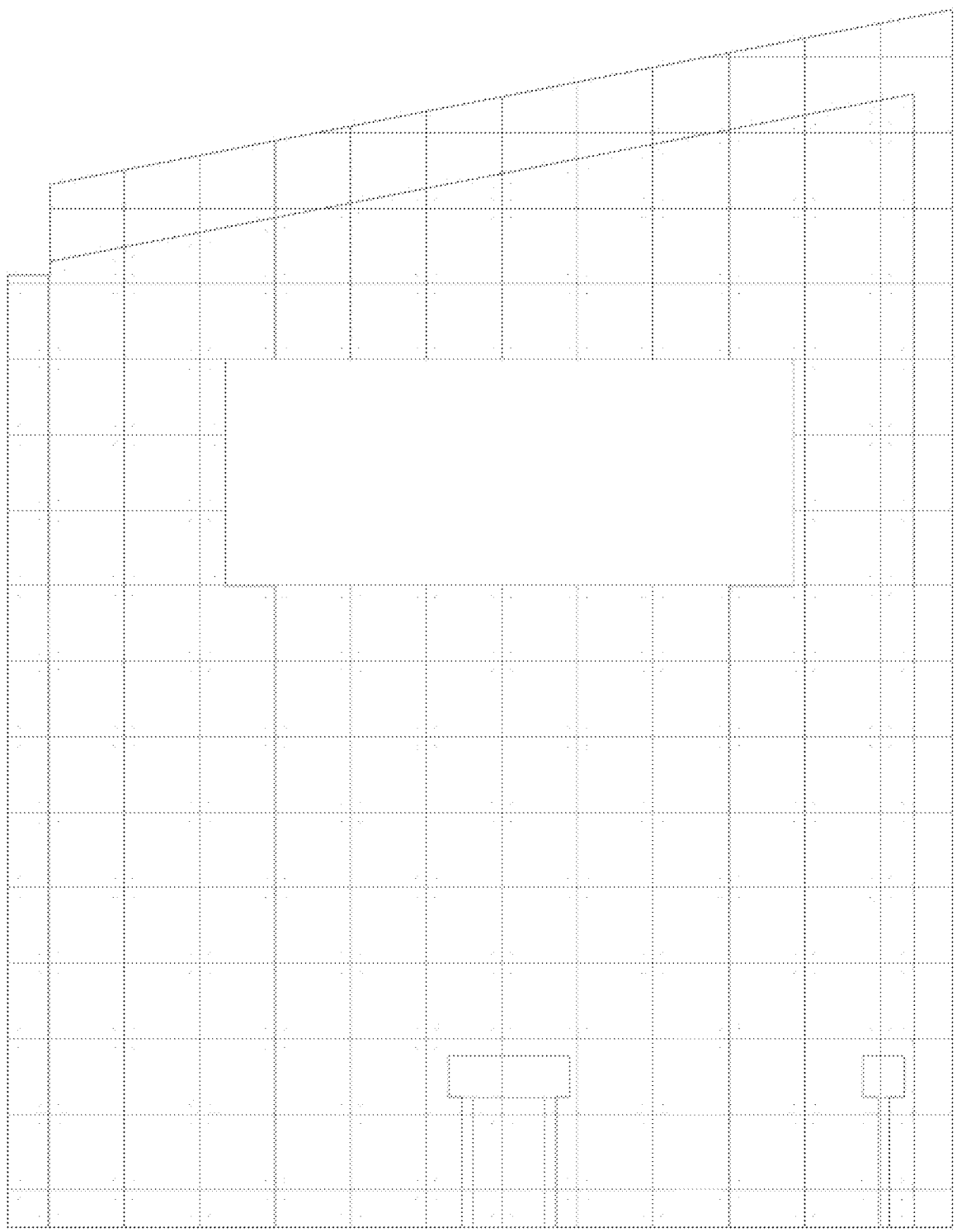
FIG. 13: Schematic design of a panel with screw pattern, oblique shape, opening for a future window and depression for a future electro-installation.

The manually positioned planks 5 of all layers 2 were screwed together by steel wood screws 10 with flat heads and with the length of 80 mm. The wood screws 10 were positioned in the pattern where for the crossing 12 of the planks 5, or in each projection pattern 13 respectively, where no subsequent wood working of the panel 1 was planned, four steel wood screws 10 were used. The positions of the wood screws 10 in the pattern are shown in FIG. 2C. In addition, the wood screws 10 closed the panel 1 along its edges on each crossing 12 of the planks 5, always 15 mm away from the side wall 11 of the panel 1 according to the design. In the last step, the side walls 11 of the panel 1 were lined by the lining film 8, where the air-tight and water-tight lining film 8 closed the cutting side wall 11 of the panel 1 and lapped over the surface 4 of the panel 1 on one side by 50 mm.

Buckling resistance of the panel 1 manufactured accordingly to example 3A with neglected openings is 1,154.376 kN.

3B. Construction of the Wooden Panel 20×3 m with Cut Out Windows, a Door and a Garage Door, Aluminium Wood Screws, the State of the Art, Three-Layer One A wooden panel with three layers, with a thickness 38.4 mm each, with the width of the planks of 300 mm and with the dimensions of the panel of 20,000×3,000 mm was manufactured, where always four aluminium wood screws were used for each crossing of the planks. Then the openings according to the schematic diagram provided in FIG. 1B were cut out in the panel: one opening for the door with the dimensions of 1,000 mm×2,100 mm, four openings for the windows with the dimensions of 1,000 mm×1,000 mm and two openings for the garage door with the dimensions of 2,000 mm×2,000 mm.

3C. Construction of the Wooden Panel 20×3 m with Cut Out Windows, a Door and Garage Door, Aluminium Wood Screws, the State of the Art, Three-Layer One A wooden panel with three layers, where the thicknesses of individual layers were 41.3 mm, 27 mm, and 41.3 mm, with the width of the planks of 300 mm and with the dimensions of the panel of 20,000×3,000 mm was manufactured, where always four aluminium wood screws were used for each crossing of the planks. Then two openings were cut out in the panel: one opening for the door with the dimensions of 1,000 mm×2,100 mm, four openings for the windows with the dimensions of 1,000 mm×1,000 mm and two openings for the garage door with the dimensions of 2,000 mm×2,000 mm.

Example 4

4 A. Buckling Resistance—Comparison of Various Panels

Buckling resistance was compared for individual solid panels 1 manufactured according to Example 1 with EOTA constant. The results are provided only for comparing panels screwed together with steel screws and panels screwed together with aluminium screws. The calculation neglects some of the constants. The results of the calculations are provided in table on FIG. 3. The table clearly shows that for maintaining a similar value of buckling resistance compared to the waste-less cut-less composed wooden panel 1 with two steel wood screws 10 on the crossings 12 of the planks 5, or in each projection pattern 13 respectively, according to Example 1B, the thickness of all layers 2 of the wooden panel 1 connected by aluminium wood screws needs to be increased from 27 mm to 38.4 mm, i.e. by 42%, or two layers 2 must be used with the thickness of 27 mm increased to 41.8 mm, i.e. by 53%. The table also shows that to retain a similar value of buckling resistance compared to the manually composed wooden panel 1 with no cutting losses with two steel wood screws 10 on the crossings 12 of the planks 1 according to Example 1B, for a wooden panel 1 with the same thickness connected using aluminium wood screws, it would be necessary to use 10 aluminium wood screws on the crossings 12. However, this is not possible for technological reasons, as it would be in contradiction with the applicable standard and/or the technologically feasible distances between individual wood screws and, on the contrary, the value of buckling resistance, would decrease due to a lack of cohesion of the wooden planks 5 in the site of connection—the planks 5 would include too many holes and the planks 5 would no longer be able to retain their static strength.

It is clear from the comparison of buckling resistance for individual solid panels 1 manufactured according to Example 1 with EOTA constant that the combination of planks 5 in thicknesses of 19 to 35 mm and widths of 80 to 400 mm necessary buckling resistance cannot be achieved by application of aluminium screws or nails to the static core 14 of panel 1. A panel 1 with layers 2 screwed together by aluminium screws or nails cannot achieve the same buckling resistance as a panel 1 with layers 2 screwed together by steel screws, defined by claim 1. Comparation was performed for individual solid panels 1 manufactured according to Example 1 with EOTA constant.

4 B. Buckling Resistance—Approaching the Real Values

For the purpose of approaching the real values as much as possible, the buckling resistance has been calculated using Eurocode constant. Buckling resistance was calculated for individual solid panels 1 manufactured with steel screws according to examples. A FIG. 6 shows the results.

Example 5

Material Savings—Comparison of Various Panels

Based on the "pilot experiment" where for various solid panels 1 buckling resistance was calculated according to Example 1 (see Example 4A), a waste-less cut-less composed wooden panel 1 with openings and also prefabricated wooden panels 1 connected by aluminium wood screws with identical buckling resistance were manufactured. The saving was calculated with disregard of the trimming of the panels 1, as trimming is required with both manually composed, and cut out panels 1 with the difference that in the case of thinner waste-less cut-less composed wooden panel 1it is necessary to trim both the side walls 11 of the panel 1, and the manually composed openings of the panel 1, while in the case of the thicker panel 1 with cut out openings, only the side walls 11 of the panel 1 need to be trimmed. It is known from experience that the values related to trimming can be disregarded for the purposes of the comparison of material consumption. The saving of wooden material in the case of individual panels 1 manufactured according to Example 2 is provided in FIG. 5A.

The saving of wooden material in the case of individual panels 1 manufactured according to Example 3 is provided in FIG. 5B.

The saving of wooden material referred to the waste-less cut-less composed wooden panel 1, which means that the consumption of material for the waste-less cut-less composed wooden panel 1 was regarded as 100%. FIG. 5A clearly shows that wooden panels 1 with cutting losses with the same buckling resistance connected by aluminium wood screws have a higher consumption of wooden material by up to 79%. In the case where the panel 1 had larger dimensions (see FIG. 5B), consumption of wooden material was higher even by 82% in the cut out wooden panels 1 connected by aluminium wood screws compared to the waste-less cut-less composed wooden panel 1.

Example 6

Using the ČSN 13829 method A, the airtightness of the house was ascertained.

6A. Measurements of the Airtightness of a Model House with Lined Panels

For the purposes of the measurements of air-tightness, a model floor of a house comprising four outside lined panels 1 with the vapour-barrier film 9 according to Example 1A and one lined ceiling panel 1 with the vapour-barrier film 9 according to Example 1F was composed on a concrete base plate. During the assembly of the house, the panels fit closely by the lined side walls, which ensures that the inner space of the house is closed and does not allow any free penetration of air and vapour. The lining film on the panel's side wall and the vapour-barrier film fit closely in a perpendicular direction and the overlapping portions of the lining film on the panel surface provide for a perfect closure of the vapour-barrier film inside the wall of the panel. The panel lined in this manner is composed with the neighbouring panel and the lining films of the closed panels fit closely thus closing the inner space.

6B. Measurements of the Airtightness of a Model House with Panels without Lining For the purposes of the measurements of air-tightness, a model floor of a house comprising four outside non-lined panels 1 with the vapour-barrier film 9 according to Example 1A and one non-lined ceiling panel 1 with the vapour-barrier film 9 according to Example 1F, which was not at the end of manufacture lined by the lining film 8, was composed on a concrete base plate.

The table in FIG. 4 shows the results of the measurements of airtightness. Obviously, the lining of individual panels 1 really reduces the airtightness, specifically by up to 13%, which is a very significant differential parameter, in particular in passive houses.

List of Marks for Terms
  Panel
  A layer of the planks 5 of the panel 1
  A contact wall of the layer 2
  The surface of the panel 1
  Plank
  A contact wall of the plank 5
  A side wall of the plank 5
  Lining film
  Film
  Steel wood screw
  A side wall of the panel 1
  Crossing of planks 5
  Projection pattern
  Static core of the panel 1
Applicability in Industry Timber structures, prefabrication of wooden panels with not many layers with excellent static parameters and with enormous savings of material.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A composed wooden wall panel (1) for construction of a wooden timber building, comprising:
   at least one opening preinstalled in the panel for a window or a door,
   a solid portion having no opening,
   a plurality of closely fitting layers comprising at least a first layer, a second layer, and a third layer of cross laminated wooden planks, and
   a static core within the solid portion, formed by the first layer, the second layer, and the third layer, the static core comprising a portion of the panel having a buckling resistance of at least 45 kN in three meters of height and one meter of width,
   wherein contact walls (6) of the planks (5) form contact walls (3) of the layers (2),
   wherein the planks (5) of the second layer (2) lay at a 45° to 135° angle with respect to the planks of the first layer,
   wherein side walls (7) of the planks (5) form orthogonal projections onto the contact walls of the layers (3) to create projection patterns (13) having quadrangle shapes, wherein each plank (5) of the layers has a thickness of 19 to 35 mm and a width of 80 to 400 mm, and each plank within a single layer has the same thickness, wherein the planks (5) of the external layers (2) of the static core (14) are placed vertically in the panel (1) and the side walls (7) of the planks (5) of the external layers (2) of the static core (14) fit closely, and
   wherein the layers (2) of the planks (5) are secured by at least two steel wood screws (10) in opposing corners of each projection pattern (13).

2. The panel (1) according to claim 1, wherein the thickness of the planks (5) ranges from 19 to 32 mm at the static core.

3. The panel (1) according to claim 2, wherein the side walls (11) of the panel (1) are lined by a lining film (8) impermeable to gases.

4. The panel according to claim 3, wherein the lining film is made of paper.

5. The panel (1) according to claim 1, wherein an air-tight vapor-barrier film (9) is positioned between the first layer and the second layer of the panel (1).

6. The panel (1) according to claim 5, wherein the air-tight vapor-barrier film (9) is made of paper.

7. The panel (1) according to claim 1, wherein the layers of the planks are secured by at least four steel wood screws (10), each screw being placed in corners of each projection pattern (13).

8. The panel (1) according to claim 1, wherein the static core (14) is connected with another layer (2) of planks (5).

9. The panel (1) according to claim 1, wherein the static core (14) is screwed together with another layer (2) of planks (5) by steel wood screws (10).

10. The panel (1) according to claim 1, comprising two static cores (14).

11. The panel (1) according to claim 10, comprising up to 7 layers.

12. The panel (1) according to claim 8, comprising up to 5 layers.

13. The panel (1) according to claim 11, wherein the static cores (14) are screwed together through another layer (2) of planks (5).

14. The panel (1) according to claim 1, wherein the buckling resistance of the static core (14) is at least 70 kN in three meters of height and one meter of width, where the thickness of the planks (5) within the static core (14) ranges from 25 to 30 mm and the width of the planks (5) within the static core (11) ranges from 140 to 200 mm.

* * * * *